United States Patent

Brown, Jr. et al.

[15] 3,638,709
[45] Feb. 1, 1972

[54] METHOD OF SUSPENDING IMMOBILIZED BIOLOGICAL SPECIMENS IN A TRANSPARENT GEL IN A TRANSPARENT CONTAINER

[72] Inventors: John H. Brown, Jr.; Bobby L. Atkins, both of Lake Jackson, Tex.

[73] Assignee: The Dow Chemical Company, Midland, Mich.

[22] Filed: Dec. 11, 1969

[21] Appl. No.: 884,344

[52] U.S. Cl. ........................... 156/57, 35/20, 117/3, 161/18, 195/100, 264/271
[51] Int. Cl. ........................... A01n 1/00, A01n 3/00
[58] Field of Search ............ 161/5, 18, 409; 47/41; 35/20; 264/271; 195/100; 117/3; 156/57

[56] References Cited

UNITED STATES PATENTS

| | | | |
|---|---|---|---|
| 2,300,495 | 11/1942 | Gerhart | 161/18 |
| 3,153,022 | 10/1964 | Calkins et al. | 260/86.1 |
| 2,486,191 | 10/1949 | Minsk et al. | 260/89.7 |
| 2,486,192 | 10/1949 | Minsk et al. | 260/89.7 |
| 2,628,178 | 2/1953 | Burnett et al. | 260/89.5 |
| 3,046,201 | 7/1962 | White et al. | 195/100 |
| 2,498,074 | 2/1950 | Feldman | 161/18 X |

*Primary Examiner*—Philip Dier
*Attorney*—Griswold and Burdick and Raymond B. Ledlie

[57] ABSTRACT

A visible immobilized specimen suspended in a stable, continuous gel where the gel is a transparent adduct of a cross-linked vinyl polymer and a water-soluble aldehyde. Such immobilized specimen is prepared by providing an optically transparent container, introducing into the container a liquid phase containing a water-soluble vinyl monomer, a water-soluble aldehyde, a cross-linking agent and a free radical producing catalyst. A specimen is positioned in the liquid phase and held in position until the polymerization of the liquid phase produces sufficient gel strength to immobilize the specimen. The container is then sealed to prevent evaporation.

7 Claims, No Drawings

METHOD OF SUSPENDING IMMOBILIZED BIOLOGICAL SPECIMENS IN A TRANSPARENT GEL IN A TRANSPARENT CONTAIN

This invention relates to an immobilized specimen suspended in a mass of a stable optically transparent gel contained within an optically transparent container and to an improved method for producing such immobilized specimens.

In the past, specimens have been immobilized in transparent containers in numerous ways. For example, biological specimens have usually been preserved for observation and display in aqueous formaldehyde or alcohol solutions. This method, however, permitted breakage and deterioration of the specimens during movement from one place to another and during the handling required for observation since such specimens were free to float or move about in the liquid medium. In more recent times, it has been possible to immobilize and display specimens in clear "potting" resins such as polystyrene, poly(methylmethacrylate) or epoxy resins. However, these resins are highly water sensitive and therefore biological specimens must be dehydrated and treated with a compatible solvent prior to "potting" in such resins. Likewise, these resins produce exothermic heat during curing and therefore usually require external cooling during the curing process and even then relatively thin layers must be employed to prevent discoloration due to heat. For biological specimens, the dehydration process and the exothermic heat during the resin curing process both tend to produce undesirable changes in the form and color of the specimens. Other known problems encountered with the potting method include the generation of high internal pressures which sometimes produce crushing of the specimen or crazing within the cured polymer, bubble formation within the resin and around the specimen, and observable boundaries between the layers of polymer and the specimen.

A more recent development and an improvement over the previous methods is disclosed in U.S. Pat. No. 3,428,470. This method of immobilizing a specimen involves suspending and positioning the specimen within a water-filled container and then gelling the water with surfactant coated particles of a cross-linked, water-swellable polymer. The function of the surfactant in such a system is to minimize the entrapment of air bubbles during the time required for the particles to swell. Not only do air bubbles and the migration of such bubbles through the swelled particles present a problem but the gel formed by this process is particulate in nature and will therefore allow dense specimens to slowly sink to the bottom since there is no attachment between the gel and the specimen. Additionally, while it is possible to include 2-5 percent polymer in the gel, this is difficult to practice and 0.5-1 percent is normally employed. At such levels of polymer concentration, the action of the ultraviolet light of sunlight and/or the presence of certain salts in the specimens frequently decreases the polymer's ability to gel thereby producing a less viscous medium which permits movement and settling of the specimen.

It is, therefore, an object of the present invention to provide to the art an improved method for immobilizing specimens which are to be viewed in the immobilized state. A further object is to provide an improved immobilized specimen free from the problems presented by other such immobilized specimens. A still further object is to provide a single method which is useful for immobilizing a broad range of specimens at or near room temperature without detracting from or modifying the natural characteristics thereof.

In accordance with the present invention, a specimen is immobilized by providing an optically transparent container, introducing into said container a liquid phase comprising water, a water-soluble vinyl monomer, a cross-linking agent, a water-soluble aldehyde and sufficient free radical producing catalyst to produce a gelled cross-linked vinyl polymer-aldehyde adduct, positioning the specimen in the liquid phase prior to gel formation, and maintaining such positioning until the liquid phase gels sufficiently to support and immobilize the specimen. The container is then sealed to provide an immobilized specimen suspended in a mass of stable optically transparent cross-linked vinyl polymer-aldehyde adduct in the form of a gel. The gel in which the specimen is suspended is substantially free of bubbles and adheres to the specimen thereby substantially eliminating visible boundaries around the specimen and providing adequate support even for large and dense specimens. Since, by the process of this invention, the polymerization takes place at about room temperature and exerts little or no pressure on the specimen, delicate features and colors remain in their natural condition. Once sealed in the gel-filled container, the specimen is not only effectively immobilized but will remain in the original immobilized state since the gel medium is substantially unaffected by ultraviolet light, by moderate changes in temperature or by the presence of salts in the specimen. There is likewise substantially no limit to the size specimen which can be immobilized by the process of this invention.

If desired, the gelled mass containing the immobilized specimen may be removed from the container. This gelled mass usually possesses sufficient cohesion and strength to be handled in a gentle manner even without the supporting container. One advantage of the present immobilization method over the "potting" method is that the specimen may be recovered by removing the gelled mass containing the specimen from the container and then removing the gel from the specimen. To remove the gel from the specimen, a strong oxidizing solution may be employed to destroy the gel if such solution will not adversely effect the specimen. Alternatively, the gel may be removed from the specimen by immersing the gelled mass in water. The excess water causes the gel to continue to swell and thereby become very fragile so that it is easily removed by hand.

The container used for the polymerization step is ordinarily the same container which will ultimately hold the immobilized specimen for display and therefore it necessarily has one or more optically transparent and preferably colorless sides and sufficient rigidity to contain the gel in fixed position. Suitable containers are made of glass, polystyrene, poly(methylmethacrylate) or other transparent polymer possessing sufficient strength and rigidity and which is not adversely affected by the gel. The container is normally placed with the open end up to receive the monomer solution and specimen and is preferably maintained in this position at least until the solution gels sufficiently to immobilize the specimen and permit sealing of the container. Normally, the open end of the container ultimately becomes the bottom or base and can therefore be translucent or colored if desired.

As used herein, the term "water-soluble vinyl monomer" refers to any monomer containing vinyl unsaturation which is soluble in water at the concentration employed and which, if it were not for cross-linking, would form a polymer which is soluble in water at the concentration employed. Suitable monomers include acrylamide, methacrylamide, acrylic acid, monovalent acrylate salts, sodiosulfoethyl(meth)acrylate, hydroxyalkyl acrylates, copolymers of acrylamide and acrylate salts, vinyl pyrrolidone, sodium styrene sulfonate and the like as well as mixtures thereof.

The water-soluble vinyl monomer is admixed with water or, preferably, with a mixture of water and a water-soluble glycol. In general, an aqueous solution of the water-soluble vinyl monomer is employed which contains from about 2 to about 50 weight percent, preferably from about 5 to about 15 weight percent, monomer based on the total weight of the gel. A water-soluble glycol may be employed to replace a substantial portion of the water and it is generally preferred to employ from about 5 to about 20 weight percent glycol based on the weight of the total gel. The use of a glycol to replace a portion of the aqueous phase not only reduces the freezing point of the gel but improves the wetting of the surface of the specimen and improves the clarity of the final gel. Ethylene glycol has been found to be particularly suitable.

In addition to the water-soluble vinyl monomer, a water-soluble aldehyde is employed as a coreactant. Any aldehyde may be employed which is soluble in water (or in the water-glycol mixture above described) to the extent necessary to obtain the desired concentration of aldehyde in the system. It has been discovered that the water-soluble aldehyde not only enters the polymerization reaction as what appears to be a cross-linker for the vinyl monomer but also functions as a promoter to greatly increase the rate of formation of a gel capable of supporting the specimen. In addition, the presence of an aldehyde significantly lowers the temperature at which the polymerization takes place. When formaldehyde is employed as the water-soluble aldehyde, it additionally serves as a preservative for the specimen and prevents any biological degradation of or growth within the polymer gel and, therefore, formaldehyde is usually preferred as the aldehyde reactant. The water-soluble aldehyde is employed in a concentration of from about 0.5 to about 50 weight percent, with from about 1 to about 10 weight percent being generally preferred. These percentages are based on the weight of water-soluble vinyl monomer present.

A water-soluble cross-linking agent is employed to provide a sufficient cross-link density in the vinyl polymer to cause said polymer to form a gel with water. Such cross-linking agent is necessary to the polymerization system even though the aldehyde produces some cross-linking. Suitable cross-linking agents include water-soluble alkylidene bis-acrylamides such as N,N'-methylenebisacrylamide, and other water-soluble divinyl compounds such as divinyl ether of diethylene glycol or polyvinyl compounds such as acrylate esters of polyglycols. Other suitable alkylidene bis-acrylamide compounds are shown in U.S. Pat. No. 3,046,201 to White, et al. The term water-soluble when used with regard to the cross-linking agent means that such cross-linking agent will form a clear solution in the polymerizable aqueous mixture at the concentration employed. The proportion of cross-linking agent to be employed is dependent on the cross-link density desired and on the monomer concentration employed. A more dilute vinyl monomer solution requires more cross-linker to achieve the same gel properties than does a more concentrated monomer solution. In general, however, from about 0.01 to about 10 weight percent, preferably from about 0.2 to about 2 percent cross-linker is employed, based on the vinyl monomer present. If too little cross-linker is employed, the gel is too thin to adequately support the specimen. If too much cross-linker is employed, the gel becomes brittle and looses cohesiveness or forms insoluble particles which precipitate from solution and cloud the gel. Therefore, sufficient cross-linker is employed to provide a gel of the desired consistency without becoming brittle and fragile or producing insoluble particles.

Polymerization of the above-described system is produced by employing a free radical producing catalyst. Since it is desirable in most instances that the polymerization take place at or near room temperature, it is therefore desirable that the catalyst or catalyst system employed be capable of producing sufficient free radicals to initiate polymerization at or near room temperature. Suitable free radical producing catalysts include ionizing radiation such as gamma rays, beta rays, or ultraviolet irradiation, redox catalyst systems such as the mixture of an alkali metal persulfate, and an alkali metal bisulfite activated with a soluble salt of a polyvalent metal such as $FeSO_4$. Substantially any of the known water-soluble, free radical producing redox catalyst systems may be employed in the composition of this invention but the catalyst composed of $K_2S_2O_8$ and $Na_2S_2O_5$ activated with $FeSO_4$ has been found particularly effective. Still better results are achieved if the redox catalyst system is additionally activated with a hydroperoxide such as tertiary butyl hydroperoxide. This permits lower activation temperatures, more rapid polymerization and additionally removes any color contained within the gel due to the presence of materials such as iron salts.

Substantially any object is suitable as the specimen to be used in the present invention. For example, biological specimens such as fish, crabs, shrimp or other sea creatures, insects, spiders, mammals, snakes, organs or portions of organs from such creatures, plants, flowers, leaves or other biological specimens which can be easily seen by the unaided eye. Likewise, nonbiological specimens such as mineral or ore samples, rocks, and the like are suitable for immobilization and display. Particularly in the case of biological specimens, it is usually desirable to preserve the specimen with a suitable preservative which will prevent the decay or decomposition thereof. For mammalian and marine specimens, the 1,3-dichloropropene salt of hexamethylenetetramine has been found to be particularly suitable.

In one mode of practicing the process of this invention, the solution of water-soluble vinyl monomer-aldehyde mixture containing sufficient catalyst and cross-linking agent to produce polymerization and gelling thereof is added to a container. The specimen is then positioned within the polymerizing mixture and held in place by wires or other support means. When sufficient polymerization and gelling has taken place to provide support for the specimen, the wires or other mechanical supporting means are removed and the container is sealed. The gel flows into the spaces occupied by the mechanical supporting means such that no airspaces or bubbles are apparent.

Another mode of practicing the process of this invention involves the steps of filling the container to the desired level with the gel-producing vinyl monomer mixture, inserting the specimen below the liquid surface and positioning it. After polymerization of the mixture has produced a gel which will support the specimen, the wires or other mechanical support means are withdrawn and background material for the display is added to the top of the gel surface. Such background material may be rocks or wood or other material to produce a desired artistic effect as a background to the sample to be displayed. Additional gel producing monomer solution is then added to fill the container and it is sealed and inverted. When polymerization of the second layer is complete, both the background and the specimen are immobilized.

The order in which the components of the polymer gel (other than the polymerization catalyst) are added together is not critical but in general it is preferred to first thoroughly mix the water-soluble vinyl monomer, the cross-linking agent, the aldehyde and a major portion of the water or water-glycol mixture. This can be stored and used as needed. The catalyst is normally added and mixed with the other components just before or just after the specimen is in position in the liquid monomer-containing solution. The time required for the catalyst-containing solution to produce a gel capable of supporting the specimen will depend on the temperature and the activity of the catalyst. While polymerization temperatures of from about 5° to about 100° C. are operable in the process of this invention, a temperature of from about 20° to about 40° C. is usually preferred since higher temperatures often adversely affect the colors and tissues of biological specimens.

In general, the time required for the monomer solution to produce a gel, after contact with the catalyst, will vary from about 5 seconds to about 30 minutes. Longer times are required at lower temperatures and when less active catalysts are employed. When highly active catalysts are used, such as large doses of ionizing radiation or redox catalysts employing a hydroperoxide as an additional promoter, gels are produced at room temperature in from about 30 to about 180 seconds.

EXAMPLE 1

A 3½ pound large-mouth black bass was preserved by injecting the body cavity with approximately 200 cc. of 10 percent aqueous Dowicil 100 (1,3-dichloropropene salt of hexamethylenetetramine) solution and then immersing for about 7 days in the preservative. Two small red crayfish and two small minnows (approx. 1 inch long) were also preserved simply by immersing in the same preservative solution for 7 days. A Plexiglas, a poly(methylmethacrylate) thermoplastic resin, container was prepared by solvent welding ¼-inch thick sheets to form a watertight box 11 inches wide by 18 inches long by 12 inches deep (outside) open on one side (an 18- by 11-inch side).

The monomer solution was prepared as follows: deionized water (21,690 ml.) was mixed with 2,480 g. of dry grade acrylamide and 2,480 g. of ethylene glycol (EG) to form a solution. This solution (No. 1) was vacuum filtered twice to remove any solids or traces of polymer present in the monomer. Then 19.84 g. of N,N'-methylenebisacrylamide was dissolved in a solution of 875 ml. deionized $H_2O$ and 97 g. of ethylene glycol to prepare a 2 percent solution (No. 2). This solution was filtered and added to solution No. 1. Solution No. 3 was prepared by admixing 248 ml. of deionized $H_2O$, 0.25 g. of $FeSO_4 \cdot 7H_2O$. It was added to solutions Nos. 1 and 2, along with 442 g. of aqueous formaldehyde (36.6 percent). After thorough mixing, the combined solution was poured into the Plexiglas box. The following solutions were likewise prepared: 882 ml. $H_2O$, 100 g. EG and 9.92 g. $K_2S_2O_8$ (Solution No. 4): 882 ml. $H_2O$, 100 g. EG and 9.92 g. $Na_2S_2O_5$ (Solution No. 5): and 444 ml. $H_2O$, 49 g. EG and 2.50 ml. of 90 percent t-butylhydroperoxide (Solution No. 6). The specimens were removed from the preservative solution and washed thoroughly with deionized $H_2O$. The bass was also rinsed with ethylene glycol to remove the last surface traces of the Dowicil. Additional solutions were prepared in the same proportions as Solutions 1–6. They were mixed in the following proportions and order and injected into the body cavities of the bass and the minnows before polymerization took place:

50 ml. Solution No. 1
2 ml. Solution No. 2
0.5 ml. Solution No. 3
0.85 ml. formaldehyde
2.0 ml. Solution No. 4
2.0 ml. Solution No. 5
2.0 ml. Solution No. 6

This injection was repeated until the body cavities were filled. The eyes of the bass were then injected with silicone fluid (DC 200) to prevent clouding due to formaldehyde, or collapse due to dehydration. The bass was positioned upside down in the monomer solution contained within the box and excess bubbles removed by gentle agitation. Positioning of the specimens was accomplished and maintained by the use of long stainless steel forceps. Once the specimens were positioned, Solution No. 4 was added and dispersed, next Solution No. 5 was added and dispersed and No. 6 was quickly poured in and dispersed. Within 60 seconds the solution was gelled to the extent that the forceps could be removed and the specimens remained in position. A maximum temperature of approximately 46° C. was reached during the polymerization. In about 2 hours, the two preserved crayfish were positioned on the surface of the gel and large, washed pebbles and rocks were also then placed on the gel. A layer of gravel about 2 inches thick was added and a solution of the following composition was poured in and around the rocks and gravel, filling the box to the brim:

2,000 ml. Solution No. 1
80 ml. Solution No. 2
20 ml. Solution No. 3
36 ml. formaldehyde
80 ml. Solution No. 4
80 ml. Solution No. 5
20 ml. Solution No. 6

After setting for another 2 hours, the gel was lightly covered with fine sand and a Plexiglas bottom was fitted and solvent-welded to the box. The finished display was then inverted to provide a lifelike display of a large bass in its natural surroundings. The gel was crystal clear and free of bubbles by the second day, and at the end of 3 months showed no sign of change or degradation.

EXAMPLE 2

A 4½-foot long, diamond-back rattlesnake was killed and immediately placed in a 10 percent aqueous solution of 1,3-dichloropropene salt of hexamethylenetetramine preservative (Dowicil 100). After several hours in this solution, additional preservative was injected into the flesh of the snake under the scales) at intervals to insure uniform preservation. It then remained for about 1 week in the preservative solution. A Plexiglas box was prepared as in Example No. 1, except that one of the 18×12 inch sides remained open. Solutions were prepared as in Example 1. The snake was then removed from the preservative, washed thoroughly with $H_2O$ and a ⅛-inch diameter, soft aluminum rod was forced down the length of the snake through the mouth with the end concealed. The snake was then coiled around and secured to a piece of washed driftwood. Solutions 1, 2, 3 and the formaldehyde were added to the box as in Example 1. The snake, attached to the wood, was inverted, positioned in the solution and the solution was stirred to remove the majority of air bubbles. Solutions 4, 5 and 6 were added in that order and the gel was formed within 60 seconds after the addition of Solution No. 6. After 2 or 3 hours, a layer of washed gravel and sand was placed on the gel surface. A 2,000-ml. solution of monomer, cross-linking agent, formaldehyde and catalyst, as in Example 1, was mixed and poured into the gravel. After polymerization the Plexiglas bottom was fitted and solvent-welded. After inverting, the resulting display was natural in appearance with the combination of reptile, wood and stone in the clear gel. No change was observed after 3 months.

EXAMPLE 3

In the manner of Example 1, a mixture of 100 g. of acrylic acid (containing 200 p.p.m. methyl ether of hydroquinone), 100 g. ethylene glycol, 300 g. deionized water, 5.0 g. of a 0.1 percent aqueous solution of $FeSO_4 \cdot 2H_2O$, 20.0 g. of a 2 percent solution of N,N'-methylenebisacrylamide in a mixture of 90% $H_2O$–10% ethylene glycol was prepared and filtered. To the filtered mixture was added 7.5 g. of a 37 percent aqueous solution of formaldehyde to constitute solution No. 1. Catalyst solutions were prepared by dissolving 1.0 g. $K_2S_2O_8$, 1.0 g. $Na_2S_2O$ and a 1.0 percent t-butyl hydroperoxide solution separately into 100 g. portions of a solution containing 90 percent water and 10 percent ethylene glycol.

A clear polystyrene container was then filled with 225 g. of solution No. 1, 18.0 ml. of $K_2S_2O_8$ solution, 18.0 ml. of $Na_2S_2O_5$ solution and 4.5 ml. of t-butyl hydroperoxide solution. After mixing the solution had a pH of 3. A preserved hermit crab was then suspended in the mixture. After 2 minutes from the time of mixing the solution became tacky and after 4.5 minutes it would support the specimen. The wire supporting means for the specimen were then removed, a bottom was sealed to the polystyrene container and it was inverted to display the hermit crab suspended in a clear, bubble-free gel. After 3 months no change was observed.

EXAMPLE 4

In the same manner as Example 1, a preserved biological specimen was suspended in a clear gel which employed, as the monomer, sodium acrylate which had been neutralized with NaOH to a pH meter reading of 6. A time of 6 minutes was required for a gel to form which had sufficient gel strength to support the specimen.

EXAMPLE 5

A preserved biological specimen was suspended in a gel in the manner of Example 1, except that the divinylether of diethylene glycol was used in the formulation to replace the N,N'-methylenebisacrylamide. With this cross-linking agent a gel having excellent clarity and capable of supporting the specimen was produced in 120 seconds from the time of mixing.

EXAMPLE 6

In the manner of Example 1, a preserved biological specimen was suspended in a clear gel except that acetaldehyde was employed in the place of formaldehyde. In 180 seconds, the gel had developed sufficient strength to support the specimen at a maximum gelling temperature of 26° C.

When propionaldehyde was employed in the method of Example 1 in place of the formaldehyde, the gel would support the specimen within 5 minutes from the time of mixing the components of the gel-forming mixture.

For purposes of comparison, the gel-forming mixture of Example 1 was prepared but no aldehyde was employed. The temperature increased to 43° C. during the reaction but after 8 minutes from the time of mixing of the components the gel had not formed sufficient strength to support the specimen.

We claim:

1. An improved method for preparing an immobilized but visible specimen which comprises
   a. providing an optically transparent container,
   b. introducing into said container a liquid phase comprising an aqueous solution of a water-soluble vinyl monomer, a water-soluble aldehyde, a cross-linking agent and a free radical producing catalyst,
   c. positioning in said liquid phase the specimen to be immobilized,
   d. maintaining said positioning until said liquid phase polymerizes to produce a gelled, cross-linked vinyl polymer-aldehyde aqueous solution having sufficient gel strength to immobilize said specimen, and
   e. sealing said container to prevent evaporation of water therefrom.

2. The method of claim 1 wherein the vinyl monomer is acrylamide.

3. The method of claim 1 wherein the aldehyde is formaldehyde.

4. The method of claim 1 wherein the cross-linking agent is an alkylidene bisacrylamide.

5. The method of claim 1 wherein the aqueous solution contains from about 5 to about 20 weight percent water-soluble glycol based on the total weight of the gel.

6. The method of claim 1 wherein the aldehyde is formaldehyde and wherein such formaldehyde is present in a proportion of from about 0.5 to about 50 weight percent based on the vinyl monomer present.

7. The method of claim 1 wherein the catalyst is $K_2S_2O_8$ and $Na_2S_2O$ activated with $FeSO_4$.

* * * * *

PO-1050
(5/69)

UNITED STATES PATENT OFFICE
CERTIFICATE OF CORRECTION

Patent No. ____3,638,709____     Dated__1 February 1972__

Inventor(s)___John H. Brown and Bobby L. Atkins_____

It is certified that error appears in the above-identified patent and that said Letters Patent are hereby corrected as shown below:

Column 1, in the third line of the Title, change "CONTAIN" to --CONTAINER--.

Column 6, line 38, delete "$Na_2S_2O$" and insert --$Na_2S_2O_5$--.

Column 8, line 21, delete "$Na_2S_2O$" and insert --$Na_2S_2O_5$--.

Signed and sealed this 1st day of August 1972.

SEAL)
test:

WARD M. FLETCHER, JR.            ROBERT GOTTSCHALK
testing Officer                  Commissioner of Patents